March 4, 1947. C. A. UPSON 2,416,721
APPARATUS AND PROCESS FOR MAKING RESINOUS ARTIFICIAL BOARD
Filed May 14, 1941
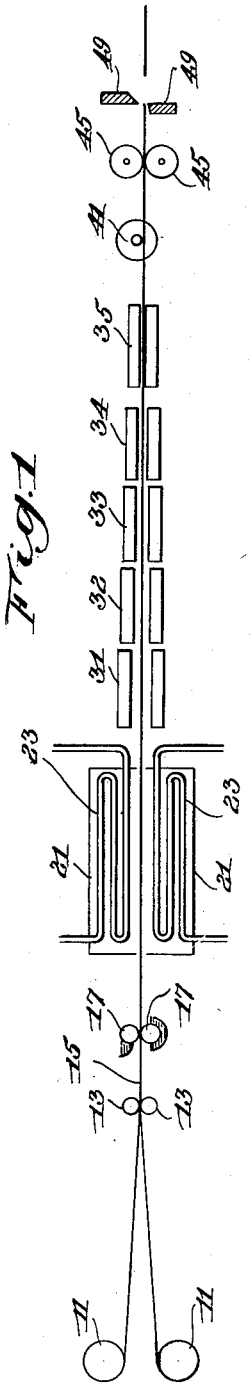
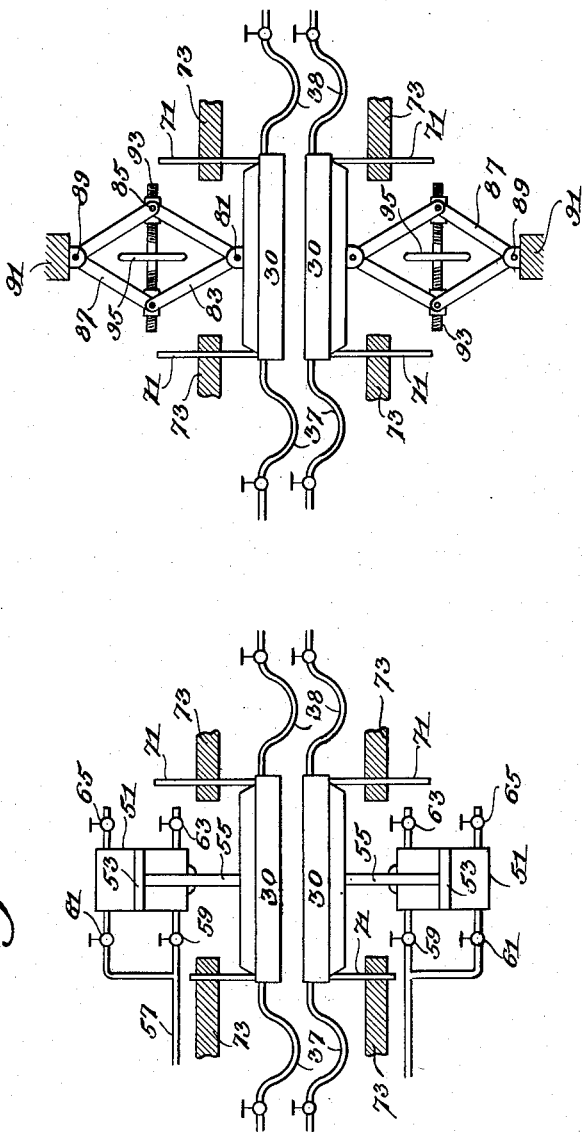
INVENTOR.
Charles A. Upson
BY Cumpston & Shepard
his ATTORNEYS.

Patented Mar. 4, 1947

2,416,721

UNITED STATES PATENT OFFICE 2,416,721

APPARATUS AND PROCESS FOR MAKING RESINOUS ARTIFICIAL BOARD

Charles A. Upson, Lockport, N. Y., assignor to The Upson Company, Lockport, N. Y., a corporation of New York Application May 14, 1941, Serial No. 393,364

12 Claims. (Cl. 117—65)

The present invention deals with a process and apparatus for making resinous artificial board, and is concerned more particularly with a process and apparatus for finishing the surface of such a board.

An object of the invention is the provision of an efficient and simple process for heat treating a coating layer of resin on a web of sheet material, during continuous advancing movement of the web, in such manner as to produce a smooth and uniform resinous coating.

Another object is the provision of a process by which the resin-coated web during continuous advancing movement, may be "ironed" under substantial pressure, by a heated stationary member sliding on the advancing web.

Still another object is the provision of simple, compact, and relatively inexpensive apparatus for carrying out efficiently the abovementioned process objects.

A further object of the invention is the provision of apparatus having a high degree of flexibility, which may be used to treat resin coated surfaces of moving webs under various conditions of temperature and pressure.

To these and other ends the invention resides in certain improvements and combinations of parts, all as will be hereinafter more fully described, the novel features being pointed out in the claims at the end of the specification.

In the drawings:

Fig. 1 is a side elevation, somewhat diagrammatic, of apparatus embodying the present invention;

Fig. 2 is an elevation, with parts in section, of one form of mechanism for adjusting the platens included in Fig. 1, and Fig. 3 is a view similar to Fig. 2 showing another form of mechanism for adjusting the platens.

The same reference numerals throughout the several views indicate the same parts.

The process of the present invention can best be understood by reference to the apparatus for carrying out the process, which will now be described in connection with Fig. 1 of the drawings.

The present invention deals more particularly with the latter part of the entire process of manufacturing a resinous artificial board; that is, the part of the process involving the final treatment of the resinous coating on one or both outer surfaces of the board. The details of the earlier treatment features which precede such final treatment are not important for the purposes of the present invention, and may be varied widely. For instance, the treatment of the board or web up to and including the step of application of the surface coating resin may be in accordance with any known prior practice, or in accordance with the process disclosed in my copending United States patent application, Serial No. 353,855, filed August 23, 1940, for Process and apparatus for making laminated board, of which copending application this present application is a continuation in part.

The present invention is applicable to webs made of a single thickness of homogeneous material, or to laminated webs made up by combining a plurality of sheets or plies. It is also applicable to webs which either are unimpregnated or are impregnated with resin or other filling materials, the impregnated or unimpregnated character of the web being immaterial for the purpose of the present invention because the invention, as above stated, relates only to the treatment of the surface coating or layer, independently of the interior character of the web or board.

Merely as an illustrative example, the board being operated upon in Fig. 1 of the drawings is shown as made up of a plurality of plies, two or more plies of paper, fabric, or other suitable sheet material being drawn continuously from the supply rolls 11 in any known suitable manner, the plies then passing between the rollers 13 and being combined with each other to form the laminated web 15. If impregnation of one or more plies with resin or other material is desired, such impregnation may be accomplished at any desired point between the supply rolls 11 and the rollers 13, and in any desired manner such as the manner disclosed in my said copending application, Serial No. 353,855.

The board or web 15, after passing beyond the rollers 13, is coated on one or both surfaces with resin, which may be applied in the form of a precast layer or film, or by sprinkling dust or solid particles of resin onto the surface of the web, or preferably by applying it in the form of liquid solution, emulsion, or dispersion, in a suitable solvent or in water. Applicator rollers of conventional type, for applying such liquid solution, emulsion, or dispersion to both faces of the web, are indicated at 17.

The resin thus applied to the web 15 is a resin selected from the class or genus of heat curing resins, and preferably selected from the sub-class or sub-genus of thermosetting resins. Thermosetting resins, as the term is used in the present application, are those resins which, after heat treatment at the temperature and for the time used in this process, become converted to a state which is substantially completely infusible and insoluble in the solvents likely to be encountered in ordinary use. Heat curing resins, as the term is used in the present application, are those resins, in addition to the thermosetting resins, which under heat treatment to the degree and for the time used in this process, do not become substantially completely infusible and insoluble, but which are polymerized by such heat treatment to a state of considerably elevated melting point, and to a state of limited solubility in the usual organic solvents with which the product is likely to come into contact in ordinary use.

In selecting a heat curing resin or mixture of resins with which to coat one or both surfaces of the board or web according to the present invention, factors to bear in mind are the degree of resistance to heat and solvents desired in the final product, the color of the surface desired in the final product, and the ready availability and cost of the resin under consideration. Thus the range of choice for the surface coating is as wide as the whole field of heat curing resins, any of which (natural or synthetic) may be used within the scope of the present invention, but certain of them will be more suitable than others, because of the factors above mentioned.

Among the thermosetting resins more suitable for the coating of the present invention, the following may be mentioned as typical examples:

Phenol-aldehyde resins, reaction products of the condensation of phenol with an aldehyde, as, for example, formaldehyde or furfural.

Urea-aldehyde resins, as, for example, products of condensation of urea and formaldehyde.

Analine-aldehyde resins, products of condensation of analine and aldehyde, such as formaldehyde.

Melamine-aldehyde resins, products of condensation of melamines and aldehydes.

Shellac cured or made thermosetting by the use of catalysts, such as urea, ammonium salts, borax, and so forth.

Alkyd resins of the drying oil types.

Among the more suitable heat curing resins, other than thermosetting resins, the following may be mentioned as typical examples:

Oil modified phenols.
Polyvinyl alcohol.
Polyvinyl acetates or chlorides.
Methyl or butyl methacrylates and other acrylate resins.
Polystyrenes.
Alkyd resins of the non-drying oil type.

If the resin is applied as a liquid solution, emulsion, or dispersion, the web 15 preferably passes, soon after application of the resin, through a heating chamber to drive off all or most of the solvent or vehicle. The heating chamber may be in the form of an oven 21 through which the web passes, the oven being heated by any suitable means such as the steam coils 23, and any desired solvent recovery apparatus may be operatively connected to the oven.

The web 15, continuing its travel, emerges from the oven and passes between a series of pairs of opposed platens having approximately flat surfaces parallel to the faces of the web, each pair of platens having two of such faces in opposed relation to each other, with the web passing between them, so that whatever frictional drag is produced on one surface of the web by one platen is approximately matched by the frictional drag produced on the opposite surface of the web by the other platen of the same pair, thus avoiding any substantial unequal drag on opposite faces of the web, which might cause internal cleavage or fracture of the web. The series of platens may include any desired number of pairs, five such pairs being here shown as a convenient example, the pairs being designated by the numerals 31 to 35, inclusive. Each platen is provided with suitable heating means preferably capable of adjustment or variation so that the degree of heat in each pair of platens may be individually adjusted, as desired. The platens are also capable of adjustment toward and away from each other to vary the pressure with which they bear upon the web 15.

After passing the last pair of platens 35, the web or board 15 is drawn past suitable trimming devices such as the rapidly rotating saws or grinding disks 41, which trim the edges of the web longitudinally, and which also split it longitudinally if the web is of multiple width. Beyond the trimming devices 41, the web passes through the nip of a pair of pull rolls 45 which tightly grip the surfaces of the web at points opposite each other, preferably across the entire width of the faces of the web. The rolls are continuously driven at a uniform but adjustable speed while the machine is in normal operation, by any suitable motive power such as an electric motor geared to the rolls. The surfaces of these pull rolls 45 may be coated with rubber or otherwise treated to increase the coefficient of friction, so as to obtain a good grip on the surfaces of the web 15, to be able to pull the web through the machine. The pull rolls constitute the web-advancing mechanism which continually pulls the web 15 forwardly through the heating means 21 and the platens 31 to 35, inclusive, maintaining it under tension during its travel through these parts of the mechanism.

Beyond the pull rolls 45 is any suitable cut off device indicated diagrammatically at 49, for cutting the web transversely at appropriate intervals to transform the continuous web into panels. Any suitable known form of rotary cut off, or "flying shears," or other mechanism accomplishing similar purposes, may be used, such for example, as the mechanism disclosed in Harney patent, 1,776,256, granted Sept. 23, 1930, or in Harney Patent 1,887,952, granted Nov. 15, 1932.

An important feature of the invention is the arrangement of the platens 31 to 35, inclusive. According to the invention, these platens are so adjusted that successive pairs of platens produce progressively increasing surface pressure against the surfaces of the web 15, as the web advances. The surfaces of these platens faced toward the web have a ground and polished finish of stainless steel, or chromium plated steel, or a similar non-corroding permanently smooth type of finish. The first pair of platens 31 (or the first several pairs when a considerable number of pairs are used) is adjusted to be merely in light contact with the faces of the board or, if the resin solvent or vehicle has not been completely driven off by previous heat treatment, the first platens may even be slightly spaced a fraction of an inch from the board, to aid the remaining solvent or vehicle of the resin to escape laterally from between the platens while it is being driven off by the heat of these platens, and to avoid firm contact with the resin while it is still in a tacky state.

The next pair of platens (or next few pairs) are somewhat closer together, pressing upon the surfaces of the web with gentle pressure. Succeeding platens are adjusted progressively closer together, to produce progressively greater unit pressure on the surfaces of the web passing through the platens, the unit pressure increasing gradually until, in the last platen pair 35, the pressure produced on the web surfaces by the platens is approximately of the order of one hundred pounds per square inch. Since the platens occur in pairs engaging opposite faces of the web, the frictional drag on opposite faces is substantially equal, as already mentioned.

The temperatures at which the platens are maintained during operation are subject to considerable variation, depending on the character of the resin employed and on the speed of travel of the web through the machine. In most cases, all of the pairs of platens may be heated to a uniform temperature in a range of about 90° C. to 210° C., although in some cases it is advantageous to graduate the temperatures progressively upward in the direction of travel of the web, making the temperature of the first pair of platens, for example, in the neighborhood of about 100° C. and progressively increasing to a temperature of about 200° C. in the last pair of platens.

This arrangement of heated platens bearing against the resin coated web with progressively increasing pressures, is found to be particularly advantageous. The platens produce what might be described as an ironing effect upon the resin film on the surface of the web. The successively greater pressures as travel continues produce a successive smoothing action on the resin coating, and take maximum advantage of the changing characteristics of the resin during travel of the web. In the early stages, the resin coating is still quite plastic and often rather tacky, so that substantial platen pressure against the resinous film would be likely to cause a very great frictional drag opposing the movement of the web, and might cause undue displacement or rupture of the resin film. So at the beginning, while this condition of the resin exists, the platens are in very light contact with or even slightly spaced from the resin, yet they are close enough so that the heat of these platens acts upon the resin and advances the cure or setting thereof.

As the tackiness of the resin film decreases and finally disappears, and as its cure advances so that the film becomes harder and more durable, it is possible to exert increasingly great surface pressures on the resin film, without damage to it and without causing undue frictional drag, until finally, at the end of the heat treatment, when the curing of the resin is just being completed, it is possible without damage to exert the above described pressure of the order of about 100 pounds per square inch against the surface of the resin film. Such a pressure, in combination with the upwardly graduated pressure preceding it, serves to compact the resin and the fibrous web on which the resin is coated, into a hard, dense board with a smooth and glossy surface of fine appearance, and of uniform characteristics through the area of the web, free from blisters or other imperfections.

As already stated, the process is a continuous one, the web advancing uniformly and continuously, rather than intermittently. The continuous motion of the web helps to avoid any sticking of the resin film to the surfaces of the platens, which might occur if there were a pause in the travel. Because the motion is purely in the plane of the contacting surfaces, there is a minimum tendency for the resin to "pick" off onto the platens.

The platens themselves may be of any known platen construction, such as the platen constructions disclosed, for example, Harney Patent 1,712,386, granted May 7, 1929, or Stevens Patent 1,714,251, granted May 21, 1929, or Stevens Patent 1,780,280, granted November 4, 1930. They may be heated electrically or by being supplied with steam or other heating fluid through flexible connections which do not interfere with the adjustment of the platens, as shown, for example, in Stevens Patent 1,775,950, granted September 16, 1930, such flexible hose connections being shown diagrammatically at 37 (inlet) and 38 (outlet) in the present drawings. Suitable valves are provided to control the flow of hot fluid so that the temperature of each platen may be adjusted as desired, independently of the temperatures of platens of other pairs.

The means for adjusting the position of the platens may be of any suitable form which permits adjustment in such manner as to vary the pressure produced by the opposed platens of one pair, upon the web passing between them, and should be capable of producing substantial pressures up to the order of about 100 pounds per square inch. For example, the arrangement may be as shown diagrammatically in Fig. 2, where a pair of platens 30 are each associated with a fluid pressure cylinder 51 having therein a piston 53 connected to a piston rod 55 which in turn is connected to the platen. Fluid pressure (either gaseous or liquid) is supplied from a conduit 57 through a control valve 59 to admit fluid to one side of the piston 53 and through a control valve 61 to admit fluid to the opposite side of the piston. Discharge valves 63 and 65, respectively, permit control of the discharge of fluid from either side of the piston. Each platen may be provided with guide rods or columns 71 firmly fixed thereto and sliding in accurately machined stationary guides 73 to prevent cocking or tilting of the platens.

With such an arrangement, applied to both of the platens as indicated diagrammatically in Fig. 2, or to either the upper or the lower platen (the other platen of the pair being mounted in fixed stationary position) it is seen that the spacing of the platens from each other and consequently the pressure which they exert upon the web passing between them, can be varied at will. The pressure produced by the platens may be increased by opening the valve 61 to admit fluid pressure to one side of the piston 53, and by opening the valve 63 to discharge fluid pressure from the opposite side. Conversely, the pressure of the platens may be decreased and their spacing may be increased by opening the valves 59 and 65.

Mechanical means rather than fluid pressure means may also be used for adjusting the platens. This mechanical means preferably is in the form of screw means, alone or combined with toggle mechanism. In Fig. 3 of the drawings there is shown diagrammatically screw means in combination with toggles, for accomplishing the adjustment. The platens 30 are provided as before with the guide rods 71 operating in the fixed guides 73. In addition, each platen has pivoted to it at 81, the ends of a pair of toggle links 83, the opposite ends of which are pivoted at 85 to another pair of toggle links 87, the opposite ends of which are pivoted at 89 to a fixed support or frame member 91.

A shaft 93, provided with a suitable hand wheel 95, has opposite screw threads near its opposite ends; that is, a right hand thread near one end and a left hand thread near the other end. These threads extend through threaded openings in blocks secured to the hinge joints 85 of the toggles. When the hand wheel 95 is turned in one direction, the toggle joints 85 are forced away from each other, so moving the toggle links as to draw the associated platen 30 away from the other platen. When the hand wheel 95 is turned in the opposite direction, the toggle joints 85 are brought toward each other, forcing the associated platen 30 toward the opposite platen of the pair, to increase the pressure on the web passing between the platens. As in the case of the fluid pressure control, this screw threaded control may be applied to both the upper and lower platens of a pair as shown in Fig. 3, or may be applied to only one of the platens of the pair, the other being mounted in stationary fixed position.

The number of pairs of platens used and the size of the platens of each pair, may be varied according to the desired speed of the machine, and the characteristics of the resin which is to be treated. For convenient handling of the platens, each platen is usually from about two feet to eight feet long in the direction of travel of the web, the other dimension of the platen being, of course, sufficient to cover the entire width of the web, which may be, for example, about four feet or eight feet. For economical production, the desired speed of travel of the web through the machine during normal operation, is usually from about 20 to 100 feet per minute. The time of heating (after driving off the resin solvent or vehicle) to complete the cure of the resin to the desired stage varies from about one minute to three minutes, depending on the particular resin employed, the temperatures used, and the extent to which it is desired to carry the cure. From the foregoing factors, the total length of the platen section of the machine can easily be fixed when the time of heat treatment and the speed of travel are once determined.

For example, if the machine is to run at the relatively low speed of 20 feet per minute, and if a total heat treating time of three minutes is desired, it is seen that the platen section must be approximately 60 feet long. This could be accomplished by providing, for example, ten pairs of platens, each pair being six feet long in the direction of web travel.

On the other hand, if a higher speed machine, of greater productive capacity, is desired, the length of the platen section must be correspondingly longer. If it is desired to make a machine capable of treating the web at a linear speed of 100 feet per minute, then the platen section would have to be approximately 300 feet long if the resin coating requires a three minute heat treatment, or could be reduced to a length of 200 feet if a quicker setting resin capable of curing in two minutes is employed. In order to reduce the expense of so many platen sections as well as the expense of a relatively long building in which to house the machine, it is usually advantageous to run the machine at a somewhat slower speed, enabling the use of a shorter platen section.

It is apparent from the above description, as shown in the drawing, that the coated web is continuously advanced through a succession of closely adjacent stations each occupied by a pair of said platens, with each pair of platens applying heat and sliding pressure to the web over a substantial area, so as to effect the substantially continuous application of heat and pressure during the passage of the web through the series of platens. Since the temperature and pressure of each pair of platens are independently controlled, such heat and pressure treatment is subject to accurate regulation, as by the increase of pressure from station to station by predetermined amounts as described to accurately control the curing of the coating.

As already stated, the process and the apparatus are not limited to the treatment of any particular resin coating, being broadly applicable to the finishing of resin coatings made of any heat curing resin. As a typical example, however, it may be said that excellent results are obtained when the fibrous web is in the form of two or more sheets or plies of fiber board made, for example, of "news board" stock having a total thickness, for example, of approximately three-sixteenths inch. For purposes of the present invention, it is immaterial whether this web be previously impregnated with resin or be left unimpregnated, but in either event, both surfaces of the web are coated, for example, by a mixture of about 70% by weight of a fast curing phenol formaldehyde resin and 30% by weight of a fast curing urea formaldehyde resin both cut in butyl alcohol to a solids content of about 60% and subsequently cut to a suitable working viscosity depending upon the coating means to be employed. When applied by coating rolls such as the rolls 17, it may be cut to an extent sufficient to give a viscosity of about forty-five seconds as measured with a No. 4 Ford cup.

After this material is coated onto the surfaces of the web, the solvent is driven off by passage through the heating means 21, and thereafter the coated web travels through the platen section for a total time, in the platen section, of approximately three minutes at a platen temperature of approximately 150° C., the platen pressures varying from zero pressure at the beginning of the platen section, progressively upward to a platen pressure of about one hundred pounds per square inch in the last or final platen section of the machine. When the web emerges from this last platen section, the resin coating on the surfaces of the web is sufficiently cured or set for practical purposes in making an artificial board of this kind, and is ironed or plated to a smooth, dense, glossy surface, well bonded to the underlying fibrous web.

A board having such a surface is particularly suitable for interior finish of walls, ceilings, etc., or for making table tops, cabinets, etc.

While certain embodiments of the invention have been disclosed, it is to be understood that the inventive idea may be carried out in a number of ways. This application is therefore not to be limited to the precise details described, but is intended to cover all variations and modifications thereof falling within the scope of the appended claims.

I claim:

1. The process of treating a web of sheet material coated with heat-curing resin which includes the step of advancing the coated web continuously and subjecting it, while advancing, to the action of heat and progressively increasing pressure acting against the coated surface of the web in sliding relation thereto to produce an ironing and smoothing action on said coated surface.

2. The process of treating a web of sheet material coated with heat-curing resin which includes the step of advancing the coated web continuously while pressing the advancing web against a heated stationary surface in contact with the coated surface of the web under progressively increasing pressure as the advance continues.

3. The process of treating a web of sheet material coated with heat-curing resin which includes the step of advancing the coated web continuously and subjecting the coated surface thereof, while it is advancing, to the ironing action of a plurality of heated smooth surfaces sliding relatively to and in contact with said coated surface at a plurality of different pressures per unit of contacting area.

4. Apparatus for processing a web of sheet material coated with heat-curing resin, including means for continuously advancing the coated web, and a plurality of stationary heated platens having flat surfaces bearing upon the coated surface of the web in sliding relation thereto as the web advances, successive platens in the direction of travel of the web bearing against the resin coating on the web with progressively increasing pressures per unit of contacting area.

5. Apparatus for processing a web of sheet material coated with heat-curing resin, including a pair of driven rolls gripping opposite faces of the web and serving to pull the web forwardly, and a plurality of pairs of opposed platens having approximately flat faces bearing against opposite surfaces of said web in advance of said driven rolls, said web sliding along said faces of said platens while it is being pulled forwardly by said rolls, successive pairs of platens in the direction of travel of the web bearing against the resin coating on the web with progressively increasing pressures per unit of contacting area.

6. Apparatus for processing a web of sheet material coated with heat-curing resin, including a pair of driven rolls gripping opposite faces of the web and serving to pull the web forwardly, a plurality of pairs of opposed platens having approximately flat faces bearing against opposite surfaces of said web in advance of said driven rolls, means for heating said platens, and means other than the mere force of gravity acting on said platens for forcing said platens toward each other to press with substantial force against said web to produce an ironing action on the resin coating on the web while the web is being drawn through the space between the platens by said driven rolls.

7. Apparatus for processing a web of sheet material coated with heat-curing resin, including a pair of continuously driven rolls gripping opposite faces of the web and serving to pull the web continuously forwardly, a plurality of pairs of opposed platens having approximately flat faces bearing against opposite surfaces of the web in advance of said driven rolls, means for heating the platens of each pair to temperatures independent of the temperatures of platens of other pairs, and mechanism for forcing the platens of each pair toward each other with a pressure independent of the pressure exerted by the platens of other pairs, so that the pressures produced on the continuously advancing web by successive pairs of platens may be graduated progressively upwardly in the direction of travel of the web as the cure of the resin coating is progressively advanced.

8. The process of treating a web of sheet material coated with a heat-curing resin comprising the steps of advancing the coated web continuously while subjecting the advancing web to substantially continuous heat and sliding pressure and progressively increasing said pressure as the advance of said web continues.

9. The process of treating a web of sheet material coated with a heat-curing resin comprising the steps of advancing the coated web continuously, subjecting the coated surface thereof, while it is advancing, to ironing action by the application thereto of substantially continuous heat and sliding pressure in adjacent successive positions through which said web is advanced and increasing said pressure from one of said positions to the next as said web is advanced therethrough.

10. The process of treating a web of sheet material coated with a heat-curing resin comprising the steps of continuously advancing said web through a succession of closely adjacent stations, applying heat and sliding pressure to said web at said stations and over a substantial area at each station, to effect substantially continuous application of said heat and pressure, and increasing the intensity of said pressure from station to station to iron said web by progressively increasing sliding pressure thereagainst and complete the curing of said coating.

11. Apparatus for processing a web of sheet material coated with heat-curing resin comprising a pair of continuously driven rolls gripping opposite faces of the web and serving to continuously advance the same, a plurality of closely adjacent pairs of opposed platens having flat faces bearing with sliding pressure against opposite faces of the web in advance of said driven rolls, means for heating the platens of each pair, and mechanism for independently pressing the platens of each pair against the web with progressively increasing pressure from one pair of platens to the next pair, for subjecting said web to substantially continuous heat and progressively increasing pressure to complete the cure of said coating as said web is progressively advanced.

12. The process of treating a hard, dense, resinous, artificial board having a surface coated with a heat-curing resin comprising the steps of continuously advancing said board through a succession of alined, closely adjacent stations while pressing said coated surface of the board into sliding contact with heated stationary surfaces at said stations, respectively, and increasing the intensity of said pressure from station to station to iron said coated surface by progressively increasing sliding pressure thereagainst to smooth and cure the same.

CHARLES A. UPSON.

REFERENCES CITED

The following references are of record in the file of this patent:

UNITED STATES PATENTS

| Number | Name | Date |
| --- | --- | --- |
| 2,224,992 | Sutherland | Dec. 17, 1940 |
| 2,075,735 | Loomis | Mar. 30, 1937 |
| 2,096,338 | Randall | Oct. 19, 1937 |
| 1,753,447 | Seidell | Apr. 8, 1930 |
| Re. 22,147 | Howald | July 28, 1942 |
| 2,064,360 | Schur | Dec. 15, 1936 |
| 2,208,236 | Weiner | July 16, 1940 |
| 2,291,670 | Wiley | Aug. 4, 1942 |